(12) United States Patent
Hochstein-Lenzen

(10) Patent No.: US 7,198,285 B2
(45) Date of Patent: Apr. 3, 2007

(54) AIRBAG COVER

(75) Inventor: Dirk Hochstein-Lenzen, Zwingenberg (DE)

(73) Assignee: Key Safety Systems, Inc., Sterling Heights, MI (US)

( * ) Notice: Subject to any disclaimer, the term of this patent is extended or adjusted under 35 U.S.C. 154(b) by 230 days.

(21) Appl. No.: 11/058,252

(22) Filed: Feb. 16, 2005

(65) Prior Publication Data

US 2005/0206133 A1 Sep. 22, 2005

(30) Foreign Application Priority Data

Mar. 16, 2004 (DE) .................. 10 2004 012 836

(51) Int. Cl.
*B60R 21/20* (2006.01)
(52) U.S. Cl. .................. 280/728.2; 280/743.1
(58) Field of Classification Search ............ 280/728.2, 280/743.1, 742, 740; 2/125, 126, 243.1, 2/275; 112/63, 147, 470, 33
See application file for complete search history.

(56) References Cited

U.S. PATENT DOCUMENTS

| 4,964,654 | A | * | 10/1990 | Bishop et al. ........... 280/728.2 |
| 6,099,028 | A | * | 8/2000 | Seifert ..................... 280/728.3 |
| 6,227,561 | B1 | | 5/2001 | Jost et al. |
| 6,406,059 | B1 | | 6/2002 | Taubenberger et al. |
| 2002/0163169 | A1 | * | 11/2002 | Fischer .................... 280/730.2 |

FOREIGN PATENT DOCUMENTS

| DE | 198 56 623 A1 | 6/2000 |
| DE | 199 13 360 A1 | 9/2000 |
| DE | 198 15 381 C2 | 1/2002 |
| DE | 102 06 754 A1 | 9/2002 |
| DE | 101 21 304 A1 | 11/2002 |
| DE | 100 01 387 C2 | 12/2003 |
| DE | 102004003983 B3 | 12/2004 |
| GB | 2 372 483 A | 8/2002 |
| WO | WO 96/07563 | 3/1996 |
| WO | WO 00/34082 | 6/2000 |

* cited by examiner

*Primary Examiner*—Paul N. Dickson
*Assistant Examiner*—Robert A. Coker
(74) *Attorney, Agent, or Firm*—Lonnie Drayer

(57) ABSTRACT

A cover for an airbag of an airbag module, in particular a side airbag, is made from at least sheet, preferably of a nonwoven material, which is folded along two edge regions to form a longitudinally extending passageway for receiving an airbag. The end regions of the cover are preferably open, with the result that in the region of the laid-together edge regions the two edge regions lie on top of one another and are connected by a frangible seam. The frangible seam is formed, at least in one end region, on only one of the edge regions.

19 Claims, 2 Drawing Sheets

AIRBAG COVER

FIELD OF THE INVENTION

The present invention relates to a cover for an airbag of an airbag module, in particular a side airbag, and to an airbag module, also in particular for a side airbag.

BACKGROUND OF THE INVENTION

Covers for airbags are well known. For example, WO 96/07563 discloses a folded airbag that is packed into a cover. The cover is provided with a frangible seam which, in the event of airbag deployment, tears as the airbag inflates and releases the airbag as quickly and with as little hindrance as possible.

After an airbag that has been folded and is being placed into a cover provided with a frangible seam, the frangible seam can tear open at the initial and final portions of the cover or unravel. To prevent this, in the prior art the initial and final portions of the frangible seam were sewn using back tacking. That is to say the frangible seam is stitched more than once over a length of a few centimeters in both end portions of the seam in these regions. This makes it possible to prevent the airbag package from opening prematurely during the process of placing the airbag inside the cover, during further production or during shipping. However, this approach is disadvantageous because if the airbag module is activated in exceptional cases the airbag cannot unfold completely and deploy from its cover, since the frangible seam is not torn open in the regions of the back tacking.

SUMMARY OF THE INVENTION

The present invention provides a cover for an airbag of an airbag module, in particular a side airbag, and an airbag module, in particular for a side airbag, in which premature tearing open of the frangible seam is prevented but reliable deployment of the airbag is ensured.

There is provided in accordance with the invention, an airbag module, in particular for a side airbag, comprising an airbag and a cover having at least one edge region of nonwoven material or a sheet which is folded along two edge regions to form a longitudinally extending passageway for receiving an airbag. The end regions are preferably open, with the result that in the region of the laid-together edge regions two edge regions lie on top of one another and are connected by a frangible seam, with the frangible seam being formed, at least in one end region, on only one of the edge regions. This advantageously provides an airbag module which has a cover which does not open during the process of placing the airbag inside the cover, during production or during transport of the airbag or the airbag module, whereas during deployment the airbag can be released over the entire frangible seam without hindrance.

DETAILED DESCRIPTION OF THE INVENTION

Figure 1:
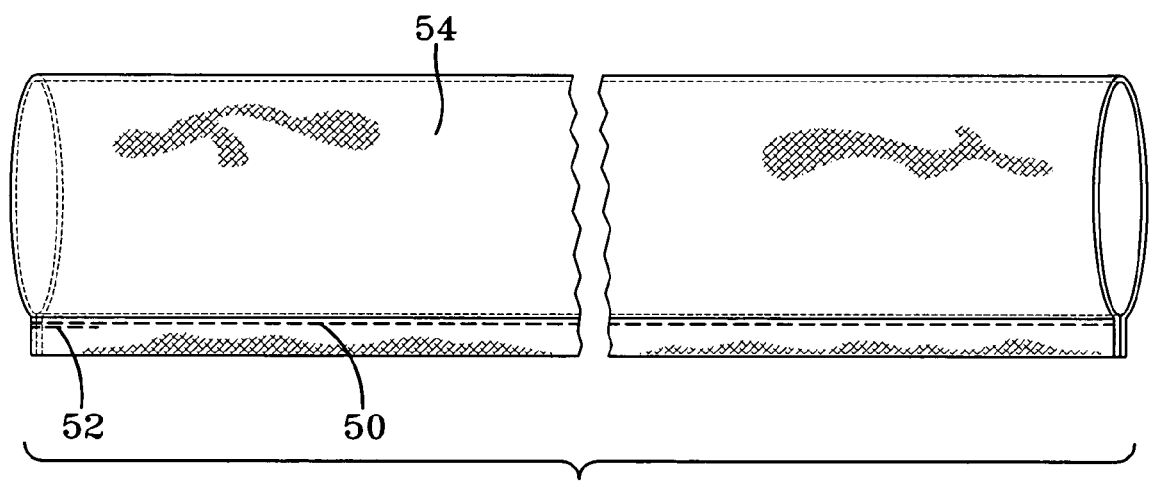
FIG. 1 is a front view of a cover for an airbag in accordance with an embodiment known from the prior art.

FIG. 1 shows a cover 54 for an airbag of an airbag module as known from the prior art. The cover 54 is elongated with a tube—like form. A rectangular sheet of a suitable material is folded to bring its longitudinal edges at least substantially together and is then sewn with a longitudinally extended seam 50. In the end regions, that is to say the distal ends of the cover, the seam is made stronger by so-called back tacking 52. Back tacking means that the seam 50 extends to the end of the cover 54 and then extends back over a certain region, preferably a few centimeters, substantially parallel to the seam 50, with the result that the seam 50 is doubled in this region. This can have the effect of preventing the seam 50 from opening unintentionally when the airbag module is assembled, but cannot ensure that the airbag is released without hindrance during deployment, since it is not possible to ensure that the seam 50 tears or opens in the region of the back tacking 52.

A cover 30 according to the invention overcomes the problem described above with known covers. In accordance with the present invention a cover 30 for an airbag or an airbag module, in particular a side airbag, comprises at least one edge region of a preferably nonwoven material or a sheet which is folded along two edge regions to form a longitudinally extending passageway for receiving an airbag, the end regions are preferably open. In the region of the laid-together edge regions two edge regions lie on top of one another and are connected by a frangible seam 10, with the frangible seam being formed, at least in one end region on only one of the edge regions. The cover is preferably formed from a material that is flexible, e.g. a medium, which may also where appropriate be woven, of nylon or the like. The frangible seam 10 forms a line of weakness that is adapted to open by being torn apart along the seam during the deployment of the airbag. The cover may for example be substantially rectangular in form, with two edge regions, preferably the longitudinal edges, being folded to form a longitudinally extending passageway for receiving an airbag. In this context, the cover may preferably be folded such that the same surface of the cover touches in the region of the edge regions, or two different surfaces, that is to say the lower face and the upper face of the cover, touch in the region of the two edge regions. The end regions of the cover are preferably open, but may also be closed by a seam, by adhesive or by a weld, to advantageously protect the airbag from external influences. The edge regions which are folded are connected to one another by a frangible seam. This may be achieved for example by a thread, which is typically formed with a tear strength of 0.3 to 50 N and thus forms the weakest region of the system. This advantageously ensures that in the event of deployment of the airbag the frangible seam tears but the cover material, which could hit or injure the vehicle passengers, does not. The frangible seam is formed, at least in one end region, on only one of the edge regions. In other words, the frangible seam 10 extends through both edge regions in the central region of the cover, but in the end region, that is to say the region in which an airbag is introduced into the cover, it is formed on only one of the two edge regions. This advantageously ensures that the cover does not open during the process of placing the airbag inside the cover, during production or during transport of the airbag module, but that a defined frangible seam is provided over the entire length of the cover, with the result that the airbag can unfold without hindrance in the event of deployment of the airbag.

Figure 2A:
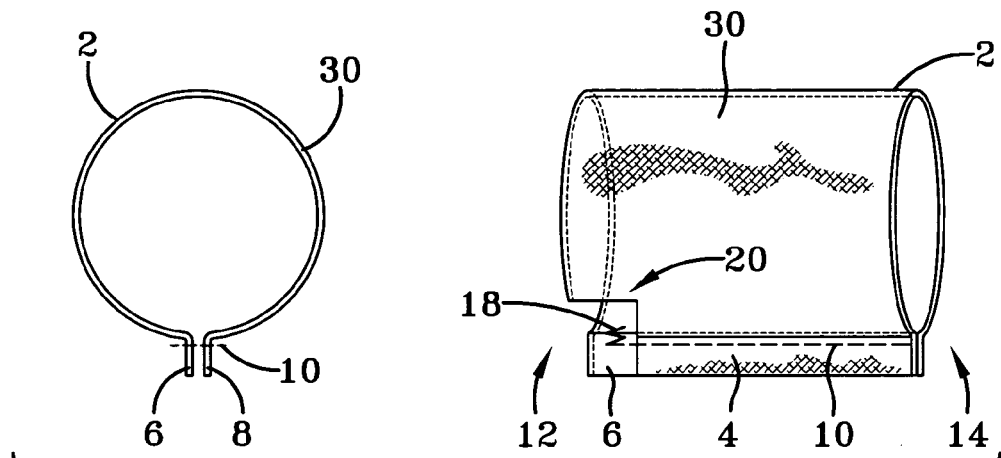
FIGS. 2a to 2c are front views and a sectional view of different embodiments of a cover for an airbag or an airbag module according to the invention.
Figure 2B:
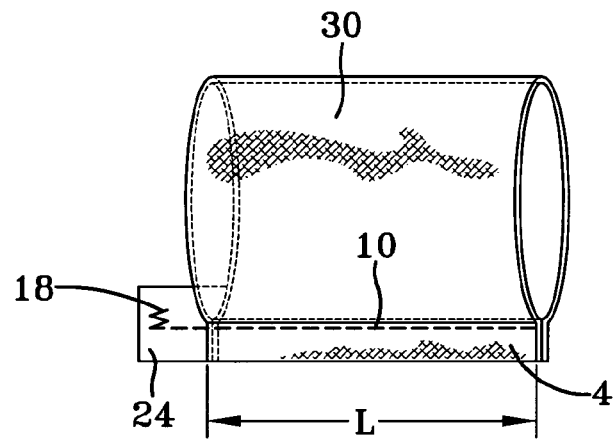
Figure 2C:
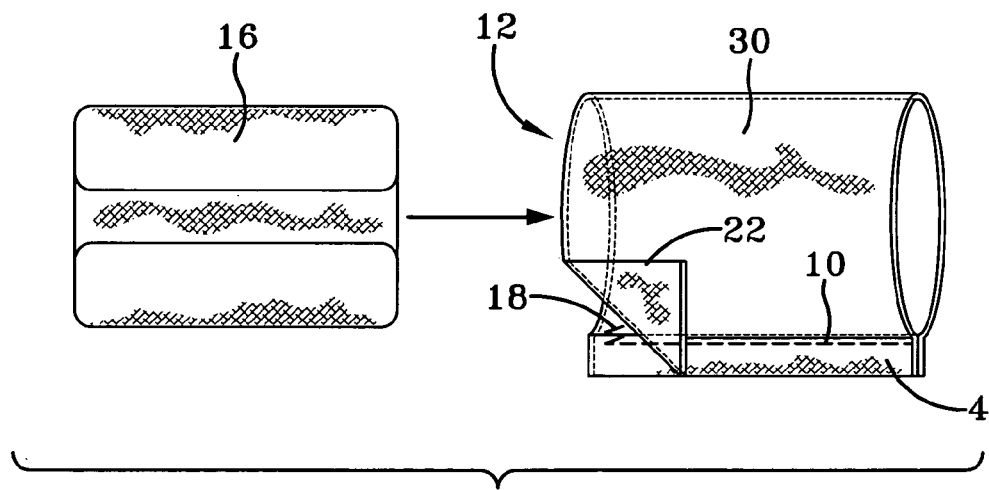

Referring to FIGS. 2a to 2c the cover 30 is formed from a sheet 2 of a suitable fabric that is preferably rectangular in shape. Preferably, the edge regions lying on top of one another have different geometrical configurations in at least one end region. For example, the edge region at the end region whereof the frangible seam is formed may advantageously be made longer than the other edge region. This makes it possible to form the reinforcement of the frangible seam in the end region more simply from a production engineering point of view, because the region provided with the reinforcement is exposed. As used herein and in the claims fabric is understood to include, but is not limited to, woven, nonwoven, or knitted fabric of natural or synthetic materials as well as films of suitable materials. The cover 30 preferably comprises a flexible material or fabric, preferably a nylon or a nylon fabric, or a flexible synthetic material. In this context, the material forming the cover is typically made from a lower quality material than the airbag material. Moreover, the material of the cover may be selected such that it withstands the relevant external influences such as mechanical loads during installation.

While the illustrated sheet 2 if laid flat is would be substantially rectangular, it may also be square or a different shape. The sheet 2 is folded such that two edge regions are juxtaposed such that in these regions two edge regions 6, 8 are side by side to form a flap 4. However; the length of the side by side portions of the edge regions are now equal. The edge regions 6, 8 in the flap are beside one another such that the same surface of the sheet 2 is in contact with itself. However, the sheet 2 may be folded such that in the flap 4 the opposing sides of the sheet 2 are in contact. However; the length of the side by side portions of the edge regions are not equal. The two edge regions 6, 8 in the flap are connected to one another by a frangible seam 10, with the result that a cover 30 having a longitudinally extending passageway for receiving an airbag is produced. The airbag cover 30 has two distal ends, namely the end regions 12 and 14. In the embodiment illustrated these ends are open, but they may also be closed by closing means such as a weld, an adhesive or sewing.

The cover 30 is formed such that the frangible seam 10 is formed, at least in one end region 12, on only one of the edge regions 6, 8. In this context, the end region 12 is that end of the cover into which an airbag 16 is pushed as shown in FIG. 2c.

In a preferred embodiment, in the region forming the inside of the cover the material of the cover 30 has a surface with a low friction constant, preferably as a result of providing a coating on the inside of the cover. A particularly low-friction coating in the interior of the cover thus has the result of ensuring that the airbag is arranged in the cover without problems, that is to say it can be pushed or pulled into the cover. The friction values between the interior of the cover and the airbag may in particular be reduced by a coating or indeed by the selection of an appropriate cover material.

In a preferred embodiment of the cover 30, the frangible seam 10 is formed, at least in one end region 12, with a reinforcement means 18. The reinforcement means 18 may for example be multiple sewing in the form of back tacking or indeed sewing over a large surface in the form of a zigzag pattern and/or over a large area in the end region. Preferably, the frangible seam 10 is reinforced to make it stronger in the end region. This advantageously has the effect of providing a cover whereof the frangible seam does not unravel in the end region during the production process. The reinforcement can moreover serve to protect these regions of the frangible seam from external mechanical influences. The frangible seam can thus take the form of back tacking in the end region, this of course being provided on only the one edge region in the end region. Similarly, it is possible to provide sewing over a large area in the form of a zigzag pattern or the like to make the frangible seam stronger. Alternatively, the reinforcement of the frangible seam is provided by a means other than stitching, for example an adhesive or a weld. This advantageously has the effect of preventing the seam from tearing open during the production process or during transport. Of course, the reinforcement is provided on only that edge region of the cover on which the frangible seam is formed in the end region.

As illustrated in FIGS. 2a to 2c, the covers 30 according to the invention have different geometrical configurations in at least one end region 12. FIG. 2a shows a cover 30 in the end region 12 whereof the edge region 8 has an indentation or recessed portion 20 that extends at least over an end region of the other edge region, with the result that the reinforcement 18 of the frangible seam 10 which is formed on the other edge region 6 is freely accessible. This hugely simplifies production of the cover according to the invention. The indentation or recess 20 may have the greatest variety of geometric shapes, for example a rectangular or a rounded shape, as a result of which it is made easier to introduce or push an airbag into the cover. A similar effect is achieved if a corner or a corner region of the edge region 8 is folded back or turned back during sewing of the frangible seam 10 to form a turned-back corner 22 which is accordingly sewn over as shown in FIG. 2c. This means the reinforcement 18 is similarly formed on only one of the edge regions 6, 8.

In the embodiment illustrated in FIG. 2b, one of the edge regions 6, 8 of the cover 30 has a projection 24 which protrudes substantially further than the longitudinal extent L of the cover. The longitudinal extent of the cover is in this case substantially parallel to the frangible seam 10. The projection 24 may be in the form of a tab and have any round, rounded or angular configuration. The frangible seam 10 terminates in the projection 24, with the frangible seam 10 having a corresponding reinforcement 18 in the projection 24. This means that in this embodiment too the reinforcement 18 is formed on only one of the edge regions 6, 8. In other words, there protrudes beyond at least one end of the airbag cover a tab-like projection into which the frangible seam is introduced and there made stronger preferably by the above-mentioned reinforcement means. The reinforcement 18 of the frangible seam 10 may be formed in only one of the two distal end regions 12 or 14 or indeed in both.

Because the reinforcement 18 in the cover 30 according to the invention is formed on only one of the edge regions 6, 8, it is possible to ensure that the frangible seam 10 does not tear open during assembly or transport of the airbag module, it being ensured that the airbag can be deployed without hindrance by the cover 30, since the frangible seam tears open reliably in the region of the edge regions 6, 8 connected to one another by the frangible seam 10.

Of course, the airbag module may have all the above-mentioned embodiments of the cover for an airbag according to the invention.

While this invention has been described as having a preferred design or construction, the present invention can be further modified within the spirit and scope of this disclosure and knowledge within the art. This application is therefore intended to cover variations, uses, or adaptations of the invention using its general principles. Further, this application is intended to cover such departures from the present disclosure within practice of the art to which this invention pertains and which falls within the bounds of the following claims.

The Invention claimed is:

1. An airbag cover comprising at least one sheet of a fabric that has a pair of end regions and a pair of edge regions, the sheet is folded to form a longitudinally extending passageway for receiving an airbag and the two edge regions are disposed side by side with the side by side edge regions being of different lengths, the edge regions being connected to each other by a frangible seam that extends through both edge regions in a central region of the cover, but in at least one of the end regions, the frangible seam is formed in only one of the edge regions with the frangible seam reinforced therein.

2. The airbag cover according to claim 1 wherein the edge regions have different geometrical configurations.

3. The airbag cover according to claim 1 wherein the edge region wherein the reinforcement is formed is longer than the other edge region.

4. The airbag cover according to claim 1, wherein the edge region at the end region wherein the reinforcement is formed has a projection that protrudes substantially further than a longitudinal extent of the longitudinally extending passageway of the cover.

5. The airbag cover according to claim 1, wherein one edge region has an indentation therein.

6. The airbag cover according to claim 1, wherein the reinforcement of the frangible seam comprises a seam that is sewn multiple times and/or over a large area in the end region.

7. The airbag cover according to claim 1, wherein the reinforcement of the frangible seam comprises an adhesive.

8. The airbag cover according to claim 1, wherein the reinforcement of the frangible seam comprises a weld.

9. The airbag cover according to claim 1, wherein the fabric is a non-woven fabric.

10. The airbag cover according to claim 1, wherein an interior surface of the longitudinally extending passageway of the cover is provided with a coating to facilitate the insertion of an airbag into the cover.

11. An airbag module comprising:
(a) an airbag cover comprising at least one sheet of a fabric that has a pair of end regions and a pair of edge regions, the sheet is folded to form a longitudinally extending passageway and the two edge regions are disposed side by side with the side by side edge regions being of different lengths, the edge regions being connected to each other by a frangible seam that extends through both edge regions in a central region of the cover, but in at least one of the end regions, the frangible seam is formed in only one of the edge regions with the frangible seam reinforced therein; and
an airbag that is folded and disposed within the longitudinally extending passageway of the airbag cover.

12. The airbag module according to one claim 11 wherein the edge regions have different geometrical configurations.

13. The airbag module according to claim 11 wherein the edge region wherein the reinforcement is formed is longer than the other edge region.

14. The airbag module according to claim 11, wherein the edge region at the end region wherein the reinforcement is formed has a projection that protrudes substantially further than a longitudinal extent of the longitudinally extending passageway of the cover.

15. The airbag module according to claim 11, wherein one edge region has an indentation therein.

16. The airbag module according to claim 11, wherein the reinforcement of the frangible seam comprises a seam that is sewn multiple times and/or over a large area in the end region.

17. The airbag module according to claim 11, wherein the reinforcement of the frangible seam comprises an adhesive.

18. The airbag module according to claim 11, wherein the reinforcement of the frangible seam comprises a weld.

19. The airbag module according to claim 11, wherein the fabric is a non-woven fabric.

* * * * *